United States Patent
Van Der Vleuten et al.

(10) Patent No.: US 10,504,216 B2
(45) Date of Patent: Dec. 10, 2019

(54) LUMINANCE CHANGING IMAGE PROCESSING WITH COLOR CONSTANCY

(71) Applicant: KONINKLIJKE PHILIPS N.V., Eindhoven (NL)

(72) Inventors: Renatus Josephus Van Der Vleuten, Veldhoven (NL); Jeroen Hubert Christoffel Jacobus Stessen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/537,890

(22) PCT Filed: Oct. 22, 2015

(86) PCT No.: PCT/EP2015/074501
§ 371 (c)(1),
(2) Date: Jun. 20, 2017

(87) PCT Pub. No.: WO2016/110341
PCT Pub. Date: Jul. 14, 2016

(65) Prior Publication Data
US 2017/0352137 A1 Dec. 7, 2017

(30) Foreign Application Priority Data
Jan. 9, 2015 (EP) ..................................... 15150555

(51) Int. Cl.
*G06K 9/00* (2006.01)
*G06T 5/00* (2006.01)
(Continued)

(52) U.S. Cl.
CPC ................ *G06T 5/009* (2013.01); *G06T 7/90* (2017.01); *H04N 1/4072* (2013.01); *H04N 5/20* (2013.01);
(Continued)

(58) Field of Classification Search
CPC .......... H04N 9/68; H04N 1/6027; H04N 5/57; G06T 5/009; G06T 2207/20208; G06T 5/007; G09G 2320/066; G09G 5/02
See application file for complete search history.

(56) References Cited

U.S. PATENT DOCUMENTS 8,593,480 B1 * 11/2013 Ballestad ............. H04N 1/6027
345/590
2007/0047808 A1 3/2007 Choe et al.
(Continued)

FOREIGN PATENT DOCUMENTS

| EP | 1326433 A2 | 7/2003 |
| EP | 2750101 A1 | 7/2014 |
| WO | 2014056679 A1 | 4/2014 |

*Primary Examiner* — Li Liu (57) ABSTRACT

An image color processing apparatus to change a luminance dynamic range includes a maximum calculation unit configured to calculate the maximum of at least three components of the input color; a brightness mapper configured to apply a predetermined function to the maximum, yielding an output value, where the function has a constraint that the output value for the highest value of the maximum cannot be higher than 1.0; a scaling parameter calculator configured to calculate a scaling parameter being equal to the output value divided by the maximum; a multiplier configured to multiply the three color components of the input color by the scaling parameter, yielding the color components of the output color; and at least one component multiplier configured to multiply a component of the input color with a weight being a real number yielding a scaled component prior to input of that component in the maximum calculation unit.

15 Claims, 6 Drawing Sheets

(51) Int. Cl.
  *H04N 1/407*  (2006.01)
  *H04N 5/20*   (2006.01)
  *H04N 5/57*   (2006.01)
  *H04N 9/68*   (2006.01)
  *G06T 7/90*   (2017.01)
  *H04N 1/60*   (2006.01)

(52) U.S. Cl.
  CPC ................ *H04N 5/57* (2013.01); *H04N 9/68* (2013.01); *G06T 2207/10024* (2013.01); *G06T 2207/20208* (2013.01); *H04N 1/6027* (2013.01)

(56) References Cited

U.S. PATENT DOCUMENTS

| | | | | |
|---|---|---|---|---|
| 2009/0091660 | A1* | 4/2009 | Wang | H04N 9/68 348/649 |
| 2010/0080459 | A1* | 4/2010 | Dai | G06T 5/009 382/170 |
| 2017/0330529 | A1* | 11/2017 | Van Mourik | H04N 5/20 |

* cited by examiner

LUMINANCE CHANGING IMAGE PROCESSING WITH COLOR CONSTANCY

CROSS-REFERENCE TO PRIOR APPLICATIONS

This application is the U.S. National Phase application under 35 U.S.C. § 371 of International Application No. PCT/EP2015/074501, filed on 22 Oct. 2015, which claims the benefit of European Patent Application No. 15150555.9, filed on 9 Jan. 2015. These applications are hereby incorporated by reference herein.

FIELD OF THE INVENTION

The invention relates to apparatuses and methods and resulting products like data storage or transmission products or signals, for converting an image with pixel colors with first luminances into an image with pixel colors with second, lower or higher luminances.

BACKGROUND OF THE INVENTION

In color processing technology, a useful category of color mappings is one in which the luminance of a pixel color changes, yet the intrinsic color itself, which can be characterized e.g. with a chromaticity like CIE 1976 (u',v'), is the same for the resultant output color and the to be processed input color. This is in fact the color mapping corresponding to lighting changes in nature: illuminating an object spectrum with more light having a light spectrum, produces colors with an increasing luminance (or another luminance correlate like e.g. a luma after conversion to this correlate) yet with the same chromaticity. This kind of processing for a technology which has recently become important, namely dynamic range mapping for image(s) and video. Currently displays are getting higher peak brightness (PB) values than the legacy so-called low dynamic range (LDR) displays, which have a PB of around 100 nit. One can speak of a high dynamic range (HDR) display, if it has a PB of at least 1000 nit, and typically displays of e.g. 2000, 5000 or 10000 nit are envisaged for the near future.

The same image cannot be rendered on both a LDR display and a HDR display and have a good look on both. E.g., if a HDR image (which is an image which may typically have object pixel luminances which have a luminance ratio of at least 1000:1, and typically a luminance distribution with both a significant amount of bright pixels, and a significant amount of dark pixels, i.e. approximately a thousand times darker than the bright ones) is rendered unmapped on a LDR display, part of the scene will yield indiscriminable black objects. And vice versa, an LDR image may have objects which look undesirably bright when directly rendered on a display of say 3000 nit PB. So one must color map a HDR grading image of a captured (or computer generated) scene, which corresponds to a HDR reference monitor, and is suitable for being rendered on displays of higher PB (than e.g. 1000 nit, or an associated minimum usable PB), to an LDR image, associated with an LDR reference monitor (and the dynamic ranges of the images, or more precisely their associated reference monitors, are different by a factor of at least 1.5, in other words approximately at least one stop or factor 2, but it may also be e.g. a factor 4 or 10 or larger). It may be noted that with the LDR and HDR images (or their reference monitor), there may also be different standard electro-optical transfer functions (EOTF) defined, which fix the relationship between technical luma codes for image transmission, and the actual luminances which correspond to those lumas when rendering on a reference monitor. LDR may use e.g. the legacy Rec. 709 gamma-type EOTF, and HDR image(s)/video may typically be encoded according to an EOTF which has at least partially an exponential (inverse logarithmic) character in its functional shape definition, e.g. following human vision characteristics like a Barten contrast sensitivity function. Incidentally, we would like to emphasize that this also means that a HDR image not necessarily has a larger amount of bits per color component than an LDR image. They may both be defined in e.g. a 3×10 bits RGB format (which can be interpreted as a [0-1.0]-scaled component definition, which we assume will be the codification of images before color mapping whatever the original and final format for the result to be transmitted are), the difference only residing in how the encoded colors have to be interpreted, i.e. according to the luminance or luma distribution defined with the given respective EOTF (and optimally color graded to yield the good corresponding look, i.e. with different object luminances for the same objects in both gradings).

A prior art which is best for elucidating the present invention and its technical contribution is previous research from applicant on a HDR-capable video codec, which we herewith further improve. Applicant has created a coding system, which allows one to encode at least two (or more) gradings of a scene, one typically being an LDR grading, and a second one being of higher dynamic range which is typically an HDR grading. The encoding works by encoding one of the two gradings as an actual image, which typically can be done by using classical video encoding containers, from a video coding standard like e.g. MPEG-HEVC. In some variants the data is reformatted in a non-compliant manner, e.g. the YCrCb color planes are filled with Yu'v' data, but as long as the data fits the amount of available memory space, and the original images can be decoded, such principles can be used, and are compatible with legacy technology at least for those technical components which don't need to do the final decoding, like e.g. a satellite transmission system, etc.

Figure 1:
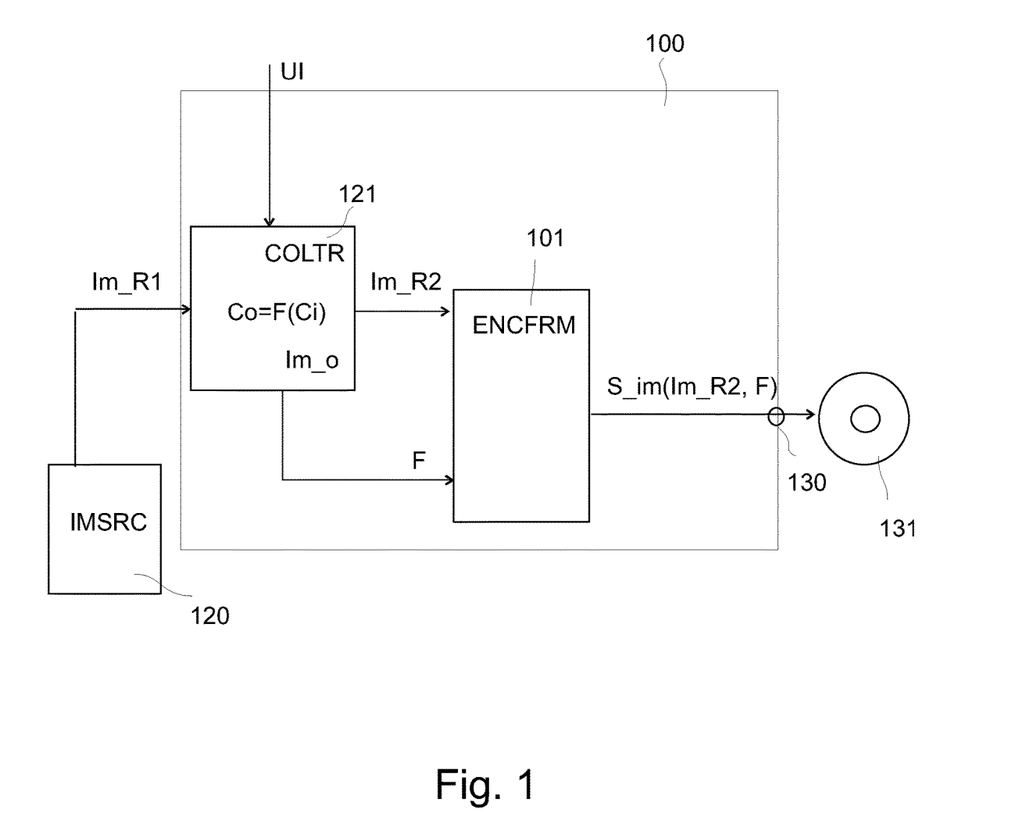
FIG. 1 schematically illustrates our method to encode at least two gradings of different luminance dynamic range, based on encoding and transmitting, typically via legacy video communication technology, the required information as a set of images of one of the gradings, and data to be able to reconstruct at a receiving side the functions to be used to color map the first set of images to a second set being the other grading.

FIG. 1 shows an example of such an encoding apparatus 100. An image source 120, say a hard disk delivers an input image Im_R1 of a first luminance dynamic range, say a HDR grading (a grading being a determination of the object luminances in the image so that to the creating artists they look correct when rendered on the associated reference display, the PB of which is typically co-encoded with the image as image-kind describing metadata). By means of a color mapper 121, the grader can chose via user data UI from e.g. a color grading keyboard and in a grading software one or more functions and their parameters to derive a second graded image for each HDR image (i.e. Im_R1), say an LDR image. Say he creates e.g. the LDR image by applying some S-curve, which function we call F, which transforms all input colors Ci of Im_R1 in resultant output colors Co of a resultant image I_mo (of course various color mappings can be done, e.g. a saturation correction, etc.). As output to our encoder 101, one of the two images Im_R1 and I_mo is selected as basic image encoding of the scene, i.e. encoding the geometric look of all objects, and in addition having a correct colorimetric look for one corresponding reference monitor. Also, all data required for uniquely specifying the color transformation is transmitted to the encoder 101 as function metadata F, which for the S-curve example may be e.g. endpoints of a middle slope part, i.e. two times 2 coordinates. The encoder 101 represents this data as numbers according to a prescribed format, e.g. it makes DCTbased image components of Im_R2, and stores the functional metadata in SEI messages, or similar, and via a data output 130 sends it to a data communication technology 131 (which in the Figure is a BD disk e.g., but this can also be an internet server for VOD, etc.).

Such dynamic range transformation is far from obvious however. In the real physical world this would only involve scaling the luminance as said above, but actual technologies have to deal with technical limitations. Instead of pure scaling, the color transformations for RGB displays can almost scale nothing in a simple manner. Not only has an actual display a limited color gamut because of its fixed maximal amount of backlight (or driving for non-backlit displays), which is tent-shaped, but a highly skewed tent which is much lower at the blue primary than near the yellows, but even all mathematical RGB spaces have the same properties. So mere scaling risks that one arrives at non-reproducible colors, which without careful handling typically results in clipping, and result color errors (at least saturation changes, but likely also hue changes). Artistically this may not be what a grader desires, that his nicely chosen orange-ish color for say a starfish suddenly becomes predominantly yellowish in the other grading. Ideally, the grader would not mind, even stronger expect, a luminance change, but he would like that particular carefully chosen orange to stay the same in all calculated gradings starting from his master grading (say a HDR master grading).

Figure 2:
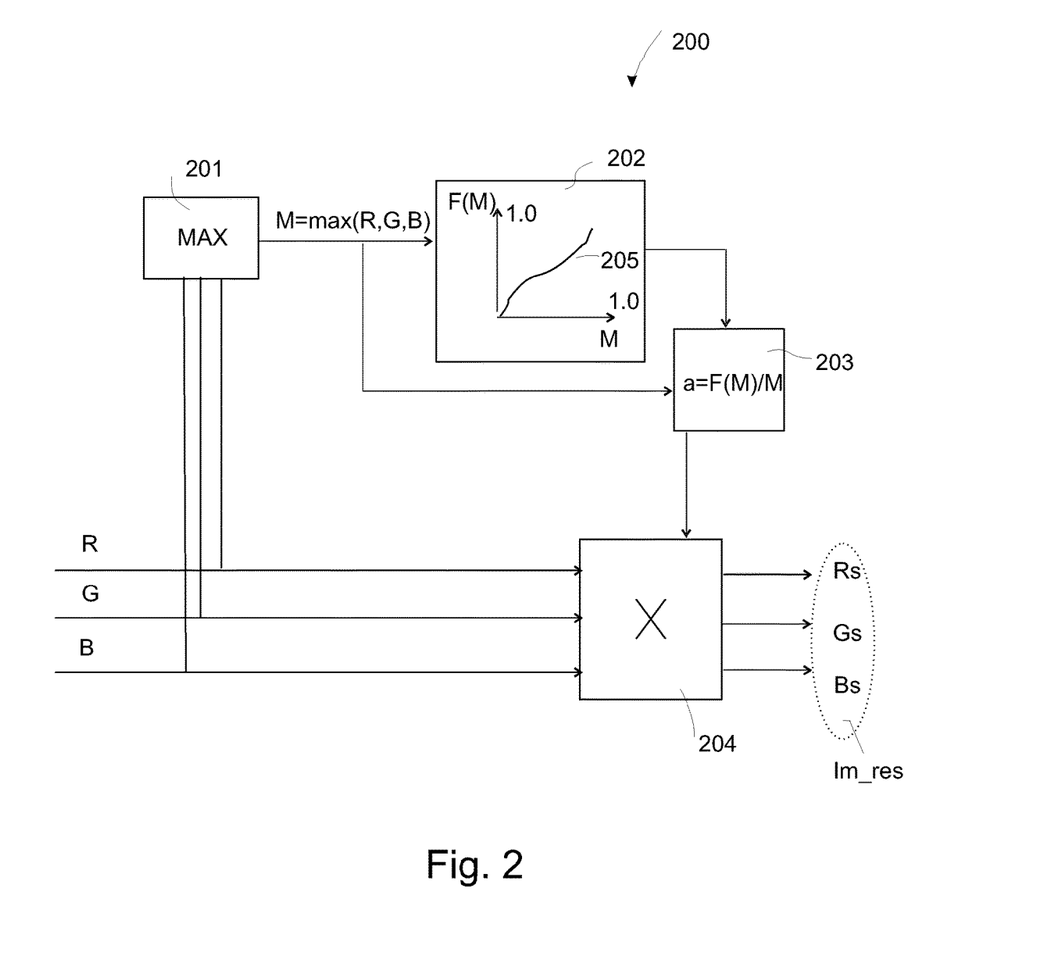
FIG. 2 schematically illustrates our basic brightness mapping technology for dynamic range conversion, as we published it in WO2014/056679.

In WO2014/056679 applicant describes a luminance changing transformation which allows one to specify a luminance mapping strategy for various possible object luminances in an input image (Im_R1), which yields different output luminances but the same color chromaticities. I.e. this is a framework to specify specific variants of the functions F. FIG. 2 of this patent resummarizes key aspects of the principle. Any input pixel color is transformed to a linear RGB representation. We only show the core components for elucidating the principle, and of course there may have been various color transformations prior to determining the red (R), green (G) and blue (B) color components, e.g. those of the basic image (Im_R2) may have been saturation processed etc. The color mapper 200 may be a component of a decoder which calculates the original image(s) based on the received basic image and functional color mapping metadata of at least a luminance mapping function (F), but it may similarly be incorporated in an encoder, when the grader is still trying various possible functions F for the best look, and ultimately outputting the data for that best look over the data output 130. Maximum calculation unit 201 calculates which of the three components is for this pixel the highest, which may e.g. be the blue component if the object wherein the pixel resides is blue. This yields the maximum M. Then a predetermined function F (which realizes the dynamic range changing required color mapping, as far as the brightness part is concerned) is applied to M, yielding F(M). In the example of FIG. 2 this function boosts the darkest colors, then keeps the middle colors approximately equal to their original values, and somewhat boosts the bright values again. This could be a useful function for e.g. mapping a HDR to a LDR grading. Instead of applying this function to the luminances themselves, brightness mapper 202 applies this function (which may be composed of partial functions, or realized as a LUT) to M. The scaling parameter calculator 203 calculates a scaling parameter a by dividing F(M) by M. Finally a multiplier 204 uses this scaling parameter a to multiply it with each color component (R, G and B), yielding appropriately scaled color components (Rs, Gs, Bs). By this action the correct output luminance is obtained for the resultant pixel color, but with preservation of the original chromaticity. The brightness mapper kind of de-skews the tent shape of the RGB gamut by using this principle. As long as one ensures that the mapping function 205 is so determined that for the maximum input (M=1.0) the output F(M) is not higher than 1, then for all chromaticities the processing is correctly scaled to the upper gamut boundary, so that no colorimetric errors due to clipping can occur.

This is hence a powerful system which gives the grader great colorimetric control over the look of his images. It does come with a minor problem however. Although for many images the results are good, it can be seen that for some images there is a noisy problem. Movies which are scanned from celluloid, have film grain. This occurs e.g. in the darks in the negatives, and so for the brights in the positive (i.e. even if a master negative is scanned, after negative-to-positive calculation). Also the inherent expected, and with which the human visual system has co-evolved to be less sensitive to, luminance-dependent photon noise gets redistributed to other grey values because of the inversion, and any luminance mapping. In short, there may be noise in various objects where it wouldn't be desired. This was not annoyingly visible on legacy LDR displays, but since the high PB of HDR displays makes everything beautiful but also more visible, so will the grain become sometimes objectionably highly visible. But also on LDR displays, sometimes the noise of a color mapped HDR grading yielding the LDR grading can become highly visible.

The problem occurs because the scaling parameter a picks up the noise in the dominant color component, and so becomes noisy itself. Say we have a relatively uniform area (which is always a bad region for conspicuousness of noise), like the air, or a near-neutral which is slightly blue. The maximum component for all or most of those pixel will hence be the blue component, which may typically be noisy for several types of image. The M value will then jitter around a value of say 0.7. The functional mapping may correspond to a multiplication of say 3. But not only that, if there is a sharp discontinuity in the function F around 0.7, the higher M values may be boosted by 3 and the lower than 0.7 values may e.g. be multiplied by 1. This shows a noisy effect on the scaled colors (Rs,Gs,Bs), which sometimes get considerably brightness boosted and sometimes not, but on an interspersed pixel-by-pixel basis. I.e., sometimes the noise can become boosted to an unacceptable level, although in all other aspects the colorimetric look of the images is perfect. And of course, ideally the content creator does not want the receiving display to perform spatial blurring, since that may also decrease the sharpness of the desired parts of the image. The solution to this problem is not so straightforward. One might think one could smoothen the scaling parameters themselves e.g., but that doesn't seem to give good results. Herebelow we present a solution for this noise problem.

SUMMARY OF THE INVENTION

The object of having a largely chromaticity-preserving luminance mapping with reduced noise sensitivity is realized by an image color processing apparatus (200) arranged to transform an input color (R,G,B) defined by a red, green and blue color component of a pixel of an input image (Im_R2) having a first luminance dynamic range into an output color (Rs, Gs, Bs) of a pixel of an output image (Im_res) having a second luminance dynamic range, which first and second dynamic ranges differ in extent by at least a multiplicative factor 1.5, comprising:
- a maximum calculation unit (201) arranged to calculate the maximum (M) of at least three components of the input color;
- a brightness mapper (202) arranged to apply a function (F) to the maximum, yielding an output value (F(M)), whereby the function is predetermined having a constraint that the output value for the highest value of the maximum (M) cannot be higher than 1.0;
- a scaling parameter calculator (203) arranged to calculate a scaling parameter (a) being equal to the output value (F(M)) divided by the maximum (M); and
- a multiplier (204) arranged to multiply the red, green and blue color components of the input color (R,G,B) by the scaling parameter (a), yielding the color components of the output color, wherein the color processing apparatus (200) comprises at least one component multiplier (303) arranged to multiply a component (B) of the input color with a weight (wB) being a real number yielding a scaled component (Bw) prior to input of that component in the maximum calculation unit (201), and wherein the at least three components comprise respective weighed or non-weighed functions of each of the red, green and blue color components. Weights will typically be between (inclusive) 0.0 and 1.0.

We have tested that it can be useful to have several combinations of weights. In principle one need to set only one weight (with the others typically by default being 1.0; which as to apparatus construction can mean the absence of an actual multiplier), e.g. one may even when luminance is not used as fourth input-set the weight of the blue channel to 0.5 or 0.75, and the red and green weights to 1.0. For a particular scene of a movie, one may set a higher weight for the luminance (or when in gamma space the luma) input 1.0, and the RGB weights low. But in other scenes it may be useful to lower the luminance weight, e.g. to 0.25 and set the color component weights high. The 3 or 4 inputs, or additional inputs, may also be non-linear functions and/or combinations of the R,G,B color components. So one or more input component to the maximum calculator may be 1.0 and other components may have weights of other values, typically lower than 1.0. Where we say weighed functions, the reader should understand that the unity function also applies, and that a non-weighed unity function means the original e.g. red color component itself, but that at least one of the inputs should be weighed by a non-unity value before going through maximization.

In common with our basic variant of WO2014/056679 we have a maximum calculation unit to determine the maximum M of the typically red, green and blue components. Not only does this maximum give some information on the brightness of a color (be it in a chromaticity-dependent manner, but that is what one wants to handle brightness-processing is a gamut-adapted manner), the maximum assures that one knows the available range of brightnesses for a particular color, and the no clipping should occur unless one explicitly designs clipping brightness mapping functions (that is at least, when the red, green and blue components themselves are the exact input for the maximum calculation, i.e. with wR=wG=wB=1.0). Especially in linear color representations, the scaling can then do a brightness processing which is similar to the linear re-lighting in nature, and the grader can design whatever brightness mapping function 205 he desires, e.g. to darken a corner of the room for a mood effect, and to increase the contrast of the grey values of e.g. a table and the objects on it.

What is different now however, is that at least one of the input components can be weighed, before the brightness position of a color is judged with it. E.g., if the noise characteristics of the image are such that blue is a dangerous channel for the noise introduction, then the coefficient of blue can be set low, e.g. 0.25 of even 0.1. This assures that the (weighed) blue component will seldomly be selected in the maximum operation, and e.g. the green one will be selected, which usually doesn't give problems. For near-neutrals the color components are approximately equal, so it doesn't matter which one is selected. Also for e.g. a cyan, one may as well use its green component as its blue one, and reds would normally have the red component being the maximum, whatever the blue scaling factor. Only for some colors, like a pure blue (e.g. (0,0 128)*4) would the blue still be selected as the maximum component even for small wB, but those colors don't occur frequently, and then the noise problem may not be visually problematic.

The weight factors may typically be preset by the grader for e.g. a scene in the movie, i.e. a shot of images with the same colorimetry, or even an entire movie, based on its capturing technology noise characteristics (the former per-scene approach has the advantage that the grader can handle the severity of the noise based on the type of color processing he wants to do on the scene, which may boost some noise severely, or not). The grader may look at the noise behavior and test a couple of weight settings with sliders, or he may be helped with an automatic weight setting algorithm based on the noise characteristics, and then finetune. E.g. the automatic analysis may spot specific color regions which have a severe noise problem, and then flash them to point the grader's attention to them. E.g. for celluloid-based movie material which was digitally scanned, a good set of weights may be wR=0.55, wG=1.0, wB=0.25. If we only weigh the three color components, it is advantageous to fix one weight to 1, because then the relationship stays correctly scaled with the pixel luminances.

Figure 5:
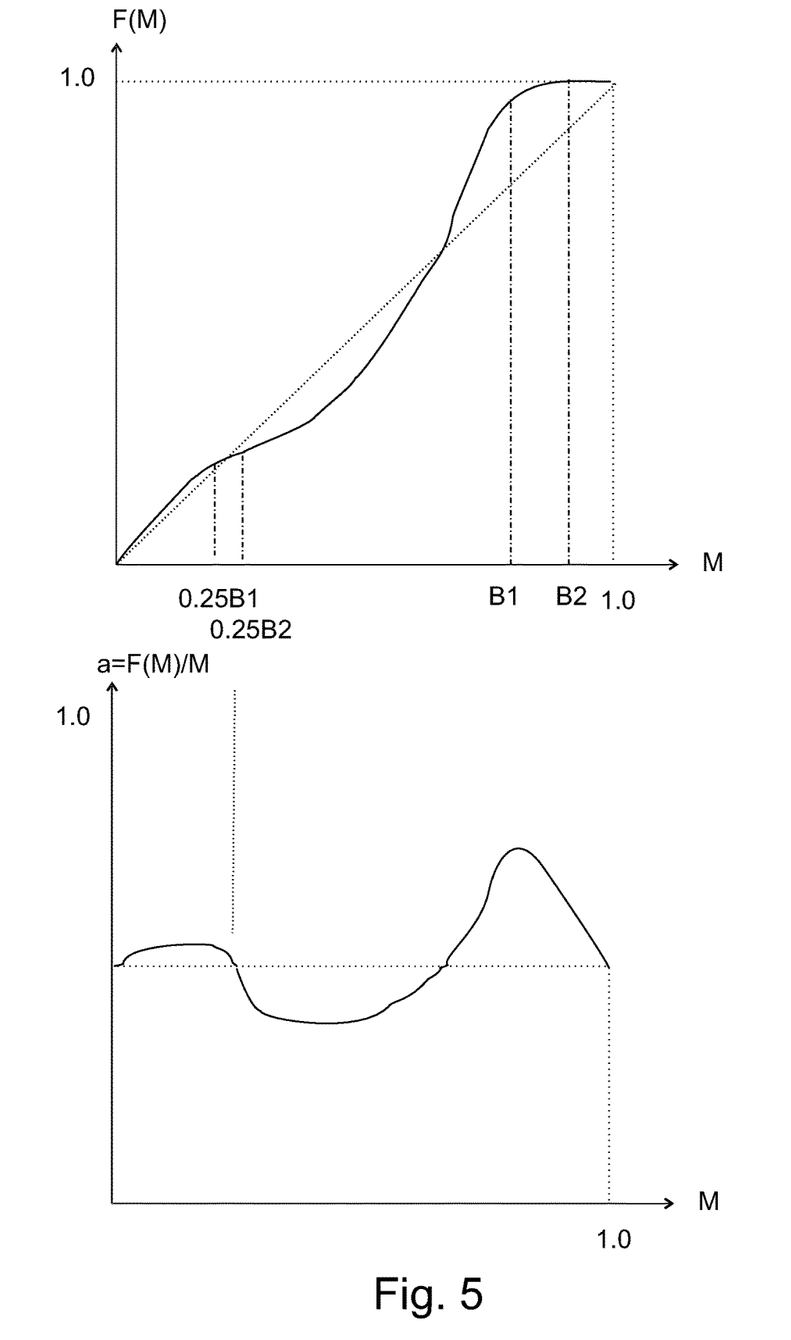
FIG. 5 schematically illustrates how a selection of some maximum values leads, via the predetermined mapping function 205 by the grader, to multiplicative factors (a) for ultimately doing the color processing; and processing.

FIG. 5 schematically shows an example of what could be a mapping to derive a LDR grading from a received HDR grading basic image (where the grader mainly decided to boost midrange contrast, and allow some clippings in the brights which may have been lamps). We look at some colors with high values of blue, B1, and B2 spread around an average blue component for a region of the image. If blue were selected as maximum, one will get the a factors at the positions B1 and B2 on the lower graph. Depending on the shape of the two graphs, the factor a can vary quite somewhat for the colors with B1 versus B2, and so even a region which should look reasonably uniform can pick up quite some noise pattern (which becomes visible because the noise in a relatively dark blue component gets leaked into the luminous green component, because the red and green components are multiplied by that same noisy factor). By using scaled blue components, they will probably not be selected. If we have a slightly bluish bright whitish sky e.g., the green components of those pixels will have approximately the same values as B1 and B2, but the green component will be less noisy so there will be a smaller spread between possible selected maximum values G1, G2, G3, . . . for neighbouring pixels, hence by the continuity of the mapping graph, also the difference in a factor will typically be less. If the blue components get selected as the maximum however, in our present embodiments the scaled blue components get selected as input to the mapping curve 205. So then we get the a factor at this lower position. Although our prior art method made sure that whatever the value of the maximum component, it couldn't be scaled higher than its theoretical maximum (e.g. 1023, and the other two components by colorimetric definition could only be as high or lower), now in such a lower region there can be a factor scalings which are well above 1.0, depending on which function the grader chose. Applying that a factor to a bright pixel color in the input image (e.g. (240, 180, 55)*4) could result in the clipping of at least one component. So now there can be some color shifts, but the grader has with the new technology of setting weights a trade-off control between noisyness and color accuracy (at worst he can retrieve the old behavior by setting all weights to 1.0).

It is advantageous when the image color processing apparatus (200) comprises a multiplier for each of the three components of the input color, and the components being red, green and blue. Usually it will be beneficial to work with a color representation which is linear RGB. Technically one may design a multiplier for each color channel, so that weights can be set, by a grader preferably, or by automatic image analyzing software. It may be that at least one of the multipliers is set to 1.0. In that case it could just as well not be present (e.g. short-circuited or bypassed), but advantageously a multiplier is present.

Advantageously the image color processing apparatus (200) obtains three weights (wR, wG, wB) from a data source associated with the input image (Im_R2). At an encoder side in a content creation apparatus, a grader may set the weights in software when looking at the characteristics of at least some images of a video, or the image if only a single still image is to be processed. At a decoding side (e.g. in a settopbox (STB), computer, television, digital cinema receiver in a movie theatre, etc.) typically the weights have been determined, and the decoder reads them from a source. E.g. they may be stored as metadata on a BD disk or other memory product, may be received as data fields in a transmitted television signal, etc. The data may include a mathematical scheme to calculate some of the weights at a receiver, but normally one wants the results obtained at encoder and decoder to be the same.

Advantageously embodiments of the image color processing apparatus (200) comprise a luminance calculation unit (306) arranged to calculate from the red, green and blue components a luminance as a fourth component of the input color, and comprising a luminance multiplier (304) arranged to multiply the luminance (Y) with a luminance weight (wY), yielding an output result which is input as a fourth input to the maximum calculation unit (201). The skilled person knows how to calculate the luminance as a linear combination of RGB color components with fixed factors, which depend on the colorimetry of the chosen representation, i.e. the chromaticities of the primaries, and the chosen white point. Doing a scaling based on the luminance corresponds to real lighting, so one may desire that at least e.g. for the non-saturated colors, or for those regions of the color plane where the upper gamut boundary doesn't drop too much compared to white (i.e. e.g. the yellows and cyans, but not the blues). By choosing appropriate weights, e.g. wY=1.0 and wR,wG,wB lower, then at least for some region of color space typically the luminance will be selected as the multiplicative factor determining quantity, and hence the processing will behave as a luminance scaling mostly. The weights of the color components can be set depending on where one wants them to take over in the maximum determination, e.g. at 0.5 or lower.

Advantageously embodiments of the image color processing apparatus (200) comprise at least one non-linear function application unit (401) arranged to apply a non-linear function to at least one of the red, green and blue color components, and wherein the maximum calculation unit (201) has as input besides the result (NR) of applying the non-linear function to the color component, at least two other color components which contain color information of the two of the red, green and blue components which were not selected for being processed by the at least one non-linear function application unit (401). This has several possible applications. On the one hand, it allows the grader to design a mapping function 205 not in a linear domain, but e.g. in a gamma domain. In that case, the three functions may apply e.g. square roots of the red, green and blue components. Scaling can be done in the function design itself. But one could also just apply a non-linear function to only one component, e.g. the blue one. This allows to create brightness estimates which conform more tightly and simply to the gamut shape. The other two components will then typically be red and green, whether having passed through a linear or non-linear function. As to the technical realization, one may e.g. design an IC which has separate connections to these units, so e.g. 7 inputs in the maximum calculation unit. When some of the inputs are not needed, their weights can be set to 0. Alternative embodiments where the designer thinks some of the connections are never needed may also e.g. just have three connections to processed versions of the RGB components, in which one e.g. sets the processing functions to a linear one if desired.

Advantageous embodiments of the image color processing apparatus (200) contain a color analysis unit (410) arranged to analyze the input color, and determine therefrom the weights (wR, wG, wB) of at least the red, green and blue color components. There may e.g. be a set of starting weights, but it may be advantageous if (in a similar manner) encoder and decoder can use some color analysis algorithm, e.g. at least classifying what the color of the current pixel is, to therefrom determine appropriate weights. E.g., if the saturation of the color is below a threshold S_T, then the weights wR, wG, wB may for pixels fulfilling that condition be set to low values, so that the luminance comes out of the maximum. If there is e.g. a lot of sky or similar color prone to noise, the weight of the blue component into the maximum calculator may be set considerably lower than 1.0, to a value predetermined in the laboratory, etc. Whether this is realized in an IC as one component with continuously updated weights, or a parallel passing to two components, one of which has e.g. fixed weights for processing the low saturation colors, is a mere matter of design.

Advantageously embodiments of the image color processing apparatus (200) contain a color analysis unit (410) arranged to analyze the input color, and determine therefrom the functional shape of at least one of the at least one non-linear functions of the at least one non-linear function application unit (401). Similarly, different functions can be chosen on colorimetric conditions of the color of the currently processed color. E.g. for unsaturated colors a linear scheme may be used in which the luminance always or usually wins in the maximum determination, in a color sector of strong blues, some non-linear function may be selected, which yields e.g. at least a blue non-linear input NB, etc. One can design the non-linear shapes so that e.g. the blue input to the maximization calculator typically comes in low, at least for particular regions of the color gamut, leading to the luminance coming out of the maximum selection.

Advantageous variants are also e.g. a method of image color processing to transform an input color (R,G,B) of a pixel of an input image (Im_R2) having a first luminance dynamic range into an output color (Rs, Gs, Bs) of a pixel of an output image (Im_res) having a second luminance dynamic range, which first and second dynamic ranges differ in extent by at least a multiplicative factor 1.5, comprising:
calculating the maximum (M) of at least three components of the input color;
applying a function (F) to the maximum, yielding an output value (F(M)), whereby the function is predetermined having a constraint that the output value for the highest value of the maximum (M) cannot be higher than 1.0;
calculating a scaling parameter (a) being equal to the output value (F(M)) divided by the maximum (M); and
multiplying the three color components of the input color (R,G,B) by the scaling parameter (a), yielding the color components of the output color,
wherein prior to performing the maximum calculation at least one component of the at least three components is multiplied with a weight being a real number yielding a scaled component (Bw) as input for that maximum calculation. In practice real numbers may of course be represented, e.g. transmitted, as integers with a sufficient amount of bits, so that they can be converted into real numbers with sufficient precision. The precision of these weights may not be that critical and then 1% accuracy e.g. would be good.

A method of image color processing in which the maximum is calculated from in addition to three red, green and blue color components also a luminance (Y) scaled with a luminance weight (wY).

A method of image color processing is provided in which the maximum calculation has at least one input which is a non-linear transformation of at least one of the red, green and blue components.

A method of image color processing is provided in which at least one of the weights (wR, wG, wB, wY) is determined based on an analysis of the pixel color.

A computer program product comprising code codifying the steps of at least one of the methods, thereby upon running enabling a processor to implement that method.

An image signal (S_im) comprising an encoding of colors of a matrix of pixels, and in addition thereto as encoded metadata at least one of the weights (wR, wG, wB, wY) usable in one of the above apparatus or method, which will typically be realized in that the signal is so defined that the receivers uniquely know what the weights mean, namely that they are intended to be used as weights for the respective color components prior to maximum calculation. Typically there may e.g. be placeholders in metadata, with a header indicating that e.g. 4 weights follow, in order red, green, blue, and luminance (or luma if the signal is defined or to be processed in non-linear domain).

The skilled reader understands that the present invention embodiments can be realized in many technical variants, e.g. the image color processing apparatus (200) may be realized as, or comprised in an image or video encoder or decoder, as comprised in e.g. a settopbox, or display, or camera, etc.

BRIEF DESCRIPTION OF THE DRAWINGS

These and other aspects of any variant of the method and apparatus according to the invention will be apparent from and elucidated with reference to the implementations and embodiments described hereinafter, and with reference to the accompanying drawings, which drawings serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions, indications of value levels in charts, etc.

In the drawings.

DETAILED DESCRIPTION OF THE DRAWINGS

Figure 3:
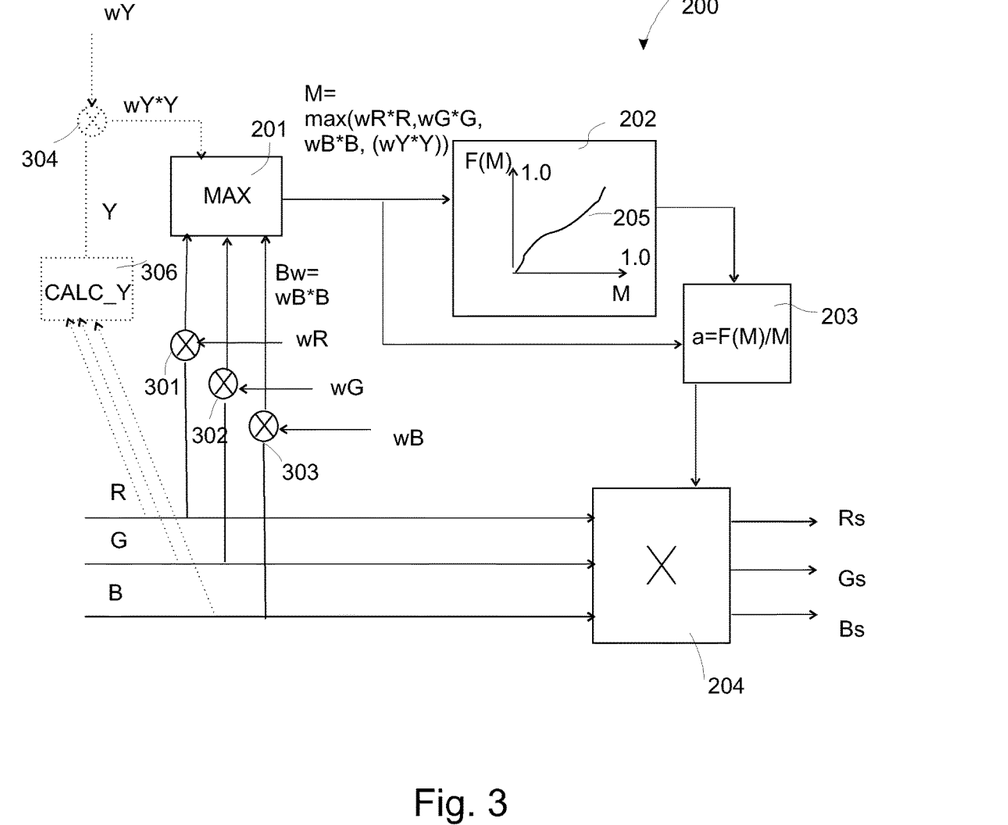
FIG. 3 schematically illustrates simpler variants of our present invention, in which at least some of the RGB color components are weighed with scale factors typically smaller than or equal to one before being input in the maximum calculation unit, and a luminance input may also be present.

FIG. 3 shows an example of how our present invention can be embodied. Linear red, green and blue components of a pixel of an input image (R,G,B) are multiplied by multipliers (301,302,303) by available weights (wR,wG,wB), resulting in weighed inputs, e.g. weighed blue Bw=wB*B. There may also be a luminance calculation unit (306), which calculates the luminance as a1*R+a2*G+a3*B, with fixed constants a1,a2,a3 depending on the color representation system, e.g. P3, Rec. 709, Rec. 2020, etc. In practical apparatuses and methods there may be color processing before and after our presently described unit, e.g. conversion to different color basis, but that is not required to understand the present invention, and would only needlessly complicate the elucidation. If a luminance input is present, there may be a luminance multiplier 304 comprised, even if it multiplies by 1.0, but if it always multiples by 1.0 that component may be missing (but the video signal may still explicitly contain four weights, in which case hardware without a luminance multiplier can still correctly process even when ignoring the luminance weight rather than to set the luminance multiplier with it).

A maximum calculation unit (201) then calculates which one of the inputs is the highest, which we call M (e.g. the green component, having a value of 180*4, if the word length of the components is e.g. 10 bit). Then a brightness mapper (202) applies a function to M, which function has been previously designed by a grader to make sure that the resultant image has a good look. This image may be e.g. an LDR grading to be rendered on displays of PB around 100 nit, calculated from a master HDR grading. At a receiving side, the master HDR images, and the data of the function, may e.g. be read from a memory product like a BD, or received as a television signal via an antenna, or read over the internet from some remote database, etc. Finally a scaling parameter calculator (203) calculates a=F(M)/M, and a multiplier (204) multiplies the RGB color components with this a, yielding output colors (Rs,Gs,Bs) for pixels in an output image, which may be formatted in an output image signal, e.g. according to a standard for communicating it from a STB to a TV, etc.

Figure 4:
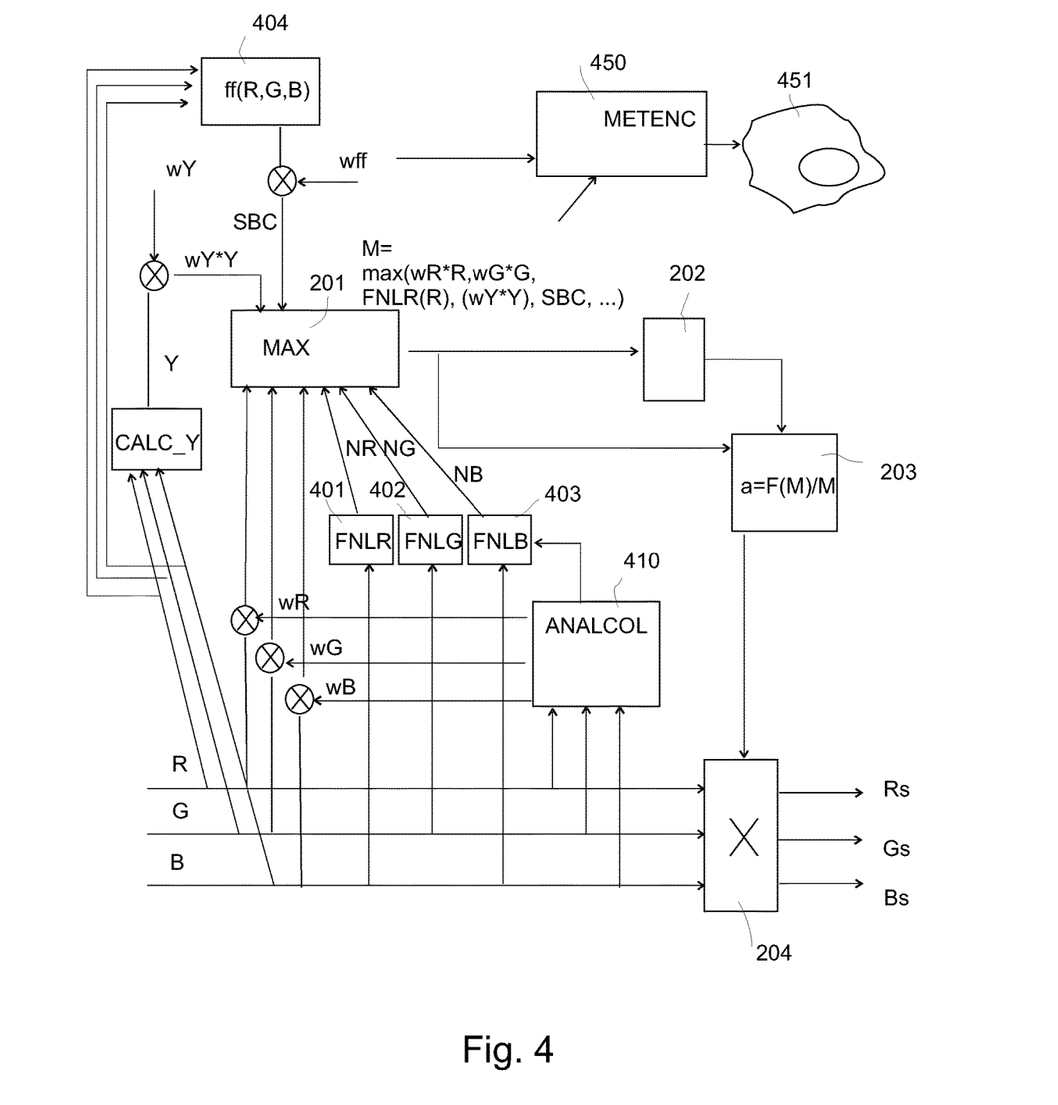
FIG. 4 schematically illustrates a more complex embodiments, in which other components are present for delivering additional input to the maximum calculation unit, such as units to non-linearly map the color components (401, ... ), a unit to calculate an arbitrary linear or non-linear combination of the color components (404), and a color analysis unit to set the weights.

FIG. 4 shows what is possible in more complex embodiments. Instead of merely reading weights, which e.g. come in synchronized with starts of shots of images of the movie, i.e. a little before the first image of the shot has to be processed, a color analysis unit (410) can calculate weights, whether they were already present and have to be overwritten at least for some situations, or have to be calculated on the fly (in the case that no weights are communicated, but one or more algorithms to derive them). In principle any analysis of the color situation can be done, typically simply looking at the color of the pixel itself, but also other colors of the image may be evaluated, e.g. of surrounding pixels to estimate if noise would be conspicuous, and also depending on what is required, such as PB of the required grading, viewing surround conditions, acceptable quality in view of price of the content, etc.

Non-linear function application units (401, 402, 403) may be present to provide non-linear color components (NR, NG, NB) as input to the maximum calculation unit. This is advantageous e.g. if one wants to design a mapping function 205 which is differently sampled, e.g. on a logarithmic axes system, etc. A non-linear transformation unit may also be present at the output of the maximum calculation unit (i.e. between units 201 and 202), i.e. non-linearly transforming the maximum M, whether it was selected from linear and or non-linear color components as input. Non-linear functions can e.g. also be realized by making the weights functions of the color component instead of one or more fixed real numbers, e.g. wB=B−cB.

A color component combination unit (404) may also be present. With this e.g. some other brightness estimate SBC can be calculated than the luminance, e.g. as b1*R+b2*G+b3*B. It may also combine linearly or non-linearly the non-linear components NR,NG,NB, or in fact calculating whatever non-linear function yielding a single real-valued parameter over the cube of possible input colors (which function may typically be embodied as one or more LUTs, which may have been optimized e.g. for particular classes of content, like which camera captured the content and potentially under which conditions, e.g. night versus day, what type the content is, e.g. nature movie versus cartoon, or graphics or content containing some graphics, like may be a tutorial or the news, etc.).

Finally, especially if the technology is embodied in an encoding side apparatus, as with all such embodiments, an metadata encoder 450 will collect all the parameters, such as all the weights, parameters defining the shapes of the non-linear functions, or the calculations of parameters, or the data of LUTs, or the algorithms classifying particular colorimetric properties of the to be processed image(s), etc., and after formatting this in a pre-agreed format, send this to a communication technology 451, e.g. a server connected to the internet for later supply to end customers, or a direct link to a customer, etc. The skilled person can understand how the present embodiments can be incorporated in various image-related technologies, like e.g. video supply systems, image or video processing software, image analysis or re-processing systems, etc.

Figure 6:
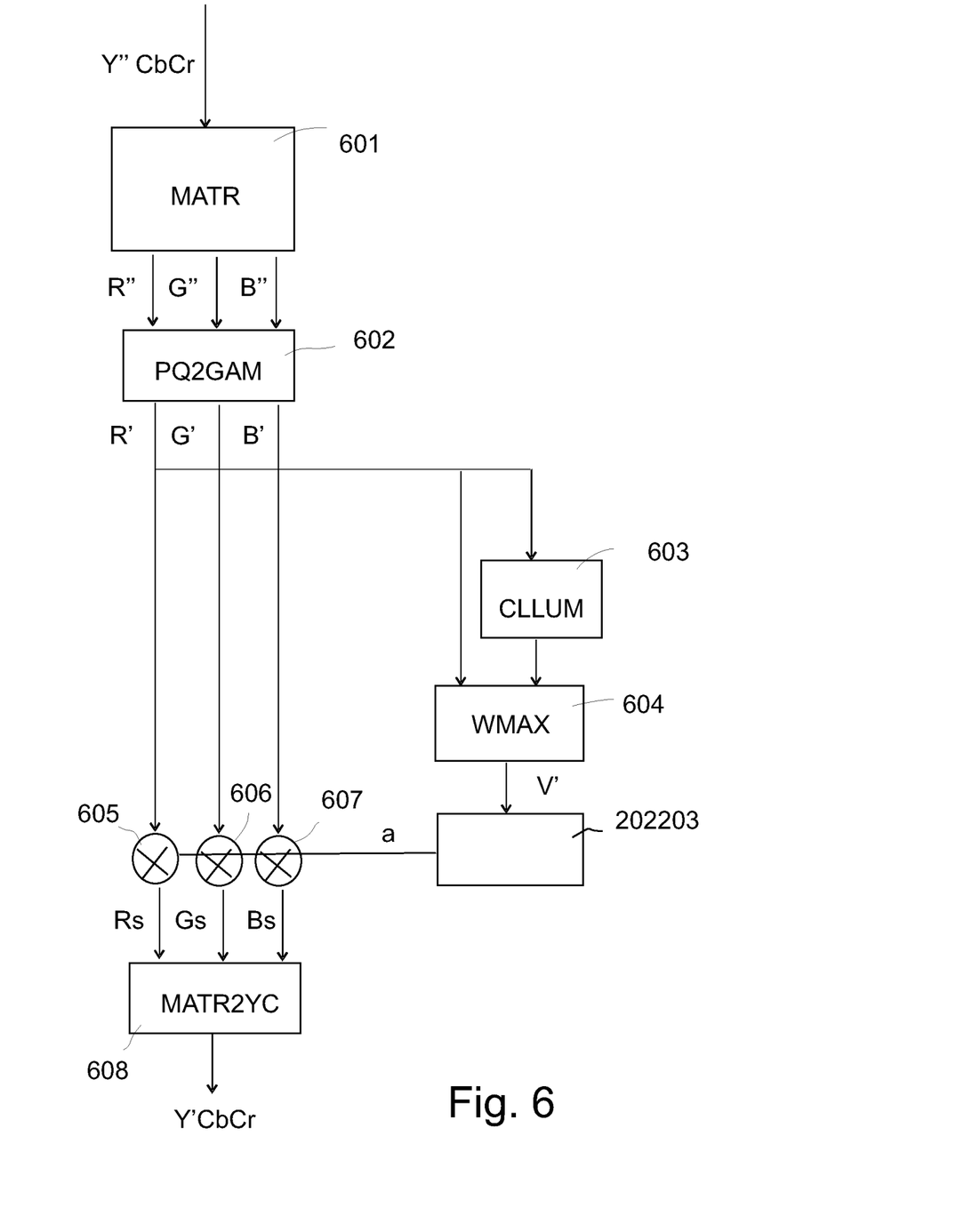
FIG. 6 shows the same principle of the color transformation based on the maximal one determination of the input color components, but in a non-linear or gamma domain.

FIG. 6 shows how the same principle can be applied in non-linear RGB representation, typically classical gamma R'G'B' versions, being approximately a square root of the linear light RGB colors, as e.g. prescribed by the opto-electronic transfer function (which defines the mapping between the linear color components, e.g. R, and the luma codes R', and vice versa via the EOTF), e.g. according to Rec. 709 (note that apart from color non-linearities the color gamut shape stays the same for the chose red, green and blue primaries).

In this mere elucidating example—we have shown a HDR-to-LDR color transformation example, but the skilled person can understand one can similarly design a LDR-to-HDR apparatus, e.g. in a receiver which gets LDR images and needs to derive HDR versions thereof for say a 5000 or 1000 nit display—we have an HDR input signal. We assumed that it was defined with a luma Y" defined by the new highly non-linear EOTF suitable for HDR encoding as in SMPTE 2084 (so-called PQ curve), but of course this is just an option.

Matrix calculator 601 converts this Y"CbCr representation of the pixel color(s) to a highly non-linear (almost logarithmic) R", G", B" representation. Non-linear function calculation unit 602 applies the fixed non-linear function to transform those components to the classical luma ones R'G'B', i.e. defined according to typically e.g. Rec. 709 function defined as:

$$R'=4.5*R \text{ if } R<0.0018 \text{ or } =1.099*\text{power}(R;0.45)-0.999 \text{ if } R>0.018$$

And the same equations for G and B, when those are defined starting from linear RGB components, but now one will start from the PQ components R"G"B", which will typically be done by calculating LUTs once a priori.

In this circuit we have added a luminance calculation unit 603, because if one calculates luminance in the non-linear space, there is some non constant luminance issue to a certain degree. What this unit does is calculate via the linear domain, i.e.:

Y'=power([CR*R'^gam+CG*G'^gam+CB*B'^gam]; 1/gam), in which gam equals e.g. 2.0, ^indicates the power operation, and CR, CG and CB are the known component weights for luminance calculations, which can uniquely be calculated colorimetrically if one knows the chromaticities of the RGB primaries and the white point. So in this manner one gets a realistic value of the pixel luma corresponding to its actual luminance.

Maximum calculation unit 604 is again any of the weighed component maximum calculation embodiments our invention allows, and scale factor calculation unit 202203 comprises the transformation of the input brightness correlate V' from the maximum to a scale factor for the multiplicative processing, i.e. comprises what units 202 and 203 do. Finally multipliers 605, 606, and 607 realize via scale factor a the color transformation to the output color (Rs,GS, Bs), which is in this embodiment matrixed again to Y'CbCr by color matrixer 608, but this is now in the gamma domain, i.e. Y' code defined according to e.g. typically the Rec. 709 EOTF.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection wired or wireless-, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable hard disks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. An image color processing apparatus, comprising:
   a function circuit,
      wherein the function circuit is arranged to apply respective weighted or non-weighted functions to each red, green and blue color component of pixels of a input image resulting in modified red, green and blue color components,
      wherein each of the functions may be one of: (i) a non-linear function; (ii) a linear scaling function multiplying a component (B) of the input color by a weight; and (iii) a unity function of an input component or combinations of the input components,
   wherein at least one modified component of the color components represents one of the red, green and blue color components of the input image weighted by a non-unity real-numbered value;
   a maximum calculation circuit, wherein the maximum calculation circuit is arranged to calculate a maximum value of the value of each of at least one modified component(s);
   a brightness mapper circuit, wherein the brightness mapper circuit is arranged to apply a function to the maximum value of the at least one modified component, yielding an output value, wherein the function is predetermined having a constraint that the output value for the highest value of the maximum(s) of the at least one modified color component(s) cannot be higher than 1.0;
   a scaling parameter calculator circuit, wherein the scaling parameter calculator circuit is arranged to calculate a scaling parameter being equal to the output value divided by the maximum value; and
   a multiplier circuit, wherein the multiplier circuit is arranged to multiply the red, green and blue color components of the input color by the scaling parameter, yielding one or more color components of an output color.

2. The image color processing apparatus of claim 1, wherein three weights of weighted functions are obtained from a data source associated with the input image.

3. The image color processing apparatus of claim 1, further comprising a luminance calculation circuit,
   wherein the luminance calculation circuit is arranged to calculate from the red, green and blue color components a luminance or luma as a fourth component of the input color,
   wherein the luminance calculation circuit comprises a luminance multiplier arranged to multiply the luminance or luma with a luminance weight, yielding an output result which is input as a fourth input to the maximum calculation circuit.

4. The image color processing apparatus of claim 3, wherein at least one weight for the red, green and blue color components is below 0.5, and the luminance weight is 1.0, at least for one to be processed image of a set of images.

5. The image color processing apparatus of claim 1, wherein a weight of a weighted function is set to 1.0.

6. The image color processing apparatus of claim 1, further comprising at least one non-linear function application circuit arranged to apply a non-linear function to at least one of the red, green and blue color components,
wherein the maximum calculation circuit has as input besides a result of applying the non-linear function to the color component,
wherein at least two other color components contain color information of the two of the red, green and blue components which were not selected for being processed by the at least one non-linear function application circuit.

7. The image color processing apparatus of claim 1, further comprising a color analysis circuit, wherein the a color analysis circuit is configured to analyze the input color, and determine therefrom weights of at least the red, green and blue color components.

8. The image color processing apparatus of claim 1, comprising a color analysis circuit, wherein the a color analysis circuit is configured to analyze the input color, and determine therefrom a functional shape of at least one non-linear function of the functions.

9. The image color processing apparatus of claim 1, wherein the maximum calculation circuit is a selection circuit, wherein the selection circuit selects the highest value from among the values of each of at least one modified component(s) at a pixel.

10. A method of operating an image color processing apparatus, comprising:
applying by a first circuit, respective weighted or non-weighted functions to each of the red, green and blue color components of an input image resulting in modified red, green and blue color components, wherein each of the functions is one of: (i) a non-linear function; (ii) a linear scaling function multiplying a component (B) of the input color by a weight; and (iii) the unity function of an input component or combinations of the input components, wherein at least one modified component represents one of the red, green and blue color components of the input image weighted by a non-unity real-numbered value;
calculating by a second circuit, a maximum of at least the three modified components;
applying, by a third circuit, a function to the maximum yielding an output value, wherein the function is predetermined having a constraint that the output value for the highest value of the maximum cannot be higher than 1.0;
calculating, by a fourth circuit, a scaling parameter being equal to the output value divided by the maximum; and
multiplying, using a fifth circuit, the red, green and blue color components of the input color by the scaling parameter, yielding one or more color components of an output color.

11. The method of image color processing of claim 10, wherein the maximum is calculated from in addition to the red, green and blue color components also a luminance or luma scaled with a luminance weight.

12. The method of image color processing of claim 10, wherein the maximum calculation has at least one input which is a non-linear transformation of at least one of the red, green and blue components.

13. The method of image color processing of claim 10, wherein at least one weight of a weighted function is determined based on an analysis of the pixel color.

14. A non-transitory computer readable storage media storing computer instructions, wherein the computer instructions are arranged to operate an image color processing apparatus to implement the method of claim 10.

15. A non-transitory computer-readable storage-medium storing computer instructions which, when executed by a processor, configure the processor to perform a method of operating an image color processing apparatus, the method comprising:
applying by a first circuit, respective weighted or non-weighted functions to each of the red, green and blue color components of an input image resulting in modified red, green and blue color components, wherein each of the functions is one of: (i) a non-linear function; (ii) a linear scaling function multiplying a component (B) of the input color by a weight; and (iii) the unity function of an input component or combinations of the input components, wherein at least one modified component represents one of the red, green and blue color components of the input image weighted by a non-unity real-numbered value;
calculating by a second circuit, a maximum of at least the three modified components;
applying, by a third circuit, a function to the maximum yielding an output value, wherein the function is predetermined having a constraint that the output value for the highest value of the maximum cannot be higher than 1.0;
calculating, by a fourth circuit, a scaling parameter being equal to the output value divided by the maximum; and
multiplying, using a fifth circuit, the red, green and blue color components of the input color by the scaling parameter, yielding one or more color components of an output color.

* * * * *